(12) United States Patent
Lachat et al.

(10) Patent No.: US 9,669,794 B2
(45) Date of Patent: Jun. 6, 2017

(54) AIRBAG CUSHION STABILIZERS

(71) Applicant: Autoliv ASP, Inc., Ogden, UT (US)

(72) Inventors: Michael J. Lachat, Shelby Township, MI (US); Frank Herzenstiel, Davisburg, MI (US); Changsoo Choi, Rochester, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/834,263

(22) Filed: Aug. 24, 2015

(65) Prior Publication Data

US 2017/0057455 A1 Mar. 2, 2017

(51) Int. Cl.
*B60R 21/2346* (2011.01)
*B60R 21/239* (2006.01)
*B60R 21/2338* (2011.01)

(52) U.S. Cl.
CPC ........ *B60R 21/2346* (2013.01); *B60R 21/239* (2013.01); *B60R 21/2338* (2013.01)

(58) Field of Classification Search
CPC ............ B60R 21/2346; B60R 21/2334; B60R 2021/23382
See application file for complete search history.

(56) References Cited

U.S. PATENT DOCUMENTS

| | | |
|---|---|---|
| 5,160,164 A | 11/1992 | Fischer et al. |
| 6,361,067 B1 | 3/2002 | Varcus et al. |
| 6,371,509 B1 | 4/2002 | Ellerbrok et al. |
| 7,128,337 B2 | 10/2006 | Kwon |
| 7,597,355 B2 | 10/2009 | Williams et al. |
| 7,597,356 B2 | 10/2009 | Williams |
| 7,862,082 B2 | 1/2011 | Thomas |
| 9,027,963 B2 * | 5/2015 | Murakami .......... B60R 21/2338 280/731 |
| 2003/0201628 A1 | 10/2003 | Roychoudhury et al. |
| 2006/0103118 A1 * | 5/2006 | Hasebe ................. B60R 21/233 280/729 |
| 2006/0269934 A1 * | 11/2006 | Woudenberg ........ C12Q 1/6844 435/6.14 |

(Continued)

FOREIGN PATENT DOCUMENTS

GB 2265118 9/1993

OTHER PUBLICATIONS

International Search Report for PCT/US2016/048073, Oct. 25, 2016, 2 pgs.
Written Opinion for PCT/US2016/048073, Oct. 25, 2016, 7 pgs.

*Primary Examiner* — James English
(74) *Attorney, Agent, or Firm* — Phillips Ryther & Winchester; Matthew D. Thayne

(57) ABSTRACT

Airbag cushion assemblies comprising internal stabilizers and related methods. Some embodiments may comprise an airbag cushion comprising a first side and a second side opposite from the first side and a hub comprising a hub opening configured to be coupled with an inflator so as to receive inflation gases during deployment of the airbag cushion through the hub opening. A stabilizer, such as, in some embodiments, a diffuser or another inflatable structure, may be positioned within the airbag cushion and may be non-releasably coupled with the airbag cushion along at least a portion of the first side, along at least a portion of the second side, and adjacent to the hub opening.

18 Claims, 4 Drawing Sheets

(56) References Cited

U.S. PATENT DOCUMENTS

| | | | |
|---|---|---|---|
| 2008/0303256 A1* | 12/2008 | Williams | B60R 21/2338 280/742 |
| 2010/0019476 A1* | 1/2010 | Pausch | B60R 21/2338 280/742 |
| 2010/0225094 A1* | 9/2010 | Rose | B60R 21/2338 280/729 |
| 2010/0225095 A1* | 9/2010 | Smith | B60R 21/2338 280/729 |
| 2012/0068446 A1* | 3/2012 | Miyata | B60R 21/2338 280/743.2 |

* cited by examiner

AIRBAG CUSHION STABILIZERS

SUMMARY

Embodiments of airbag cushion assemblies comprising airbag cushion stabilizers are disclosed herein, along with related methods. In some embodiments, lateral skewing or rotation of the airbag cushion during deployment, and/or other undesirable deployment characteristics, may be corrected and/or improved by providing airbag cushion assemblies comprising such stabilizers.

In some embodiments airbag cushion assemblies may be provided with an internal stabilizer comprising an inflatable structure, such as a diffuser. By non-releasably coupling such structures within an airbag cushion, an internal structure may be provided within the cushion that may stabilize inflation and prevent skewing and/or other undesirable deployment characteristics.

In other embodiments, the stabilizer may comprise a tether. Preferably the tether is non-releasably coupled to the airbag cushion within the inflation chamber, rather than releasably attached, such as by way of a tear seam or the like, as with most tethers. This may provide a rigid internal structure to guide inflation dynamics in desirable ways.

In preferred embodiments, the stabilizer may be coupled to the airbag cushion along non-inflatable portions of the cushion, such as within selvage regions of the cushion adjacent to sew lines between adjacent panels making up the cushion. In some such embodiments, the stabilizer may be coupled along such selvage regions at opposite sides of a throat region of the cushion.

In a more particular example of an airbag cushion assembly according to some embodiments, the assembly may comprise an airbag cushion comprising a first side and a second side opposite from the first side. In some embodiments, the first side may be formed by a first panel and the second side by a second panel. The assembly may further comprise a hub comprising a hub opening configured to be coupled with an inflator so as to receive inflation gases during deployment of the airbag cushion through the hub opening. A means for stabilizing the airbag cushion during deployment, such as a diffuser or another inflatable structure, may be positioned within the airbag cushion. The means for stabilizing the airbag cushion during deployment may be non-releasably coupled with the airbag cushion along at least a portion of the first side and along at least a portion of the second side, and the means for stabilizing the airbag cushion during deployment may be non-releasably coupled with the airbag cushion adjacent to the hub opening.

In some embodiments, the diffuser or other means for stabilizing the airbag cushion may be non-releasably coupled with the airbag cushion at a first selvage region of the airbag cushion along the first side and at a second selvage region of the airbag cushion along the second side.

In some embodiments, the airbag cushion may comprise a throat defining a throat region. In such embodiments, the hub may be positioned within the throat region, and the diffuser or other means for stabilizing the airbag cushion may be non-releasably coupled with at least one of an upper portion of the throat and a lower portion of the throat at opposing sides of the of the throat. In some such embodiments, the throat may comprise an upper panel, a first side panel, a second side panel opposite from the first side panel, and a lower panel, wherein the first side panel is coupled with the upper panel at a first side of the upper portion of the throat by a first sew line, wherein the second side panel is coupled with the upper panel at a second side of the upper portion of the throat opposite from the first side by a second sew line, and wherein the diffuser or other means for stabilizing the airbag cushion is sewn to the airbag cushion along at least a portion of the first sew line and along at least a portion of the second sew line. In some such embodiments, the diffuser may be sewn to the airbag cushion along a first selvage region of the airbag cushion adjacent to the first sew line and along a second selvage region of the airbag cushion adjacent to the second sew line.

In some embodiments, the diffuser or other means for stabilizing the airbag cushion may be non-releasably coupled with the airbag cushion at the first side by a first distance from a center of the hub opening, and may be non-releasably coupled with the airbag cushion at the second side by a second distance from the center of the hub opening. In some such embodiments, the first distance may differ from the second distance, such that specific skewing or other deployment problems may be mitigated, or such that the deployment characteristics may otherwise be controlled in a desired manner. Thus, for example, in some embodiments, the first distance may differ from the second distance by at least about five percent. In some such embodiments, the first distance may differ from the second distance by between about ten percent and about fifty percent.

In another specific example of an airbag cushion assembly according to other embodiments, the assembly may comprise an airbag cushion comprising a throat defining a throat region, wherein the throat comprises an upper throat region and a lower throat region. The assembly may further comprise a hub comprising a hub opening configured to be coupled with an inflator so as to receive inflation gases during deployment of the airbag cushion through the hub opening. The hub may be positioned within the throat region. The assembly may further comprise a means for stabilizing the airbag cushion during deployment. The means for stabilizing may be positioned within the airbag cushion, and may be non-releasably coupled with the airbag cushion along at least one of opposing sides of the upper throat region and opposing sides of the lower throat region. In some embodiments, the means for stabilizing may be coupled along both the opposing sides of the upper throat region and the opposing sides of the lower throat region.

The means for stabilizing may comprise, for example, a diffuser or another inflatable structure. In other embodiments, the means for stabilizing may comprise a tether. In some embodiments, the means for stabilizing may be configured to provide internal structure to the airbag cushion during deployment. In some embodiments, the means for stabilizing may be non-releasably coupled with the airbag cushion at the hub.

In some embodiments, the means for stabilizing may be non-releasably coupled with the airbag cushion at a first side of the throat by a first distance from a center of the hub opening, and may be non-releasably coupled with the airbag cushion at a second side of the throat by a second distance from the center of the hub opening. The second distance may differ from the first distance so as to allow the means for stabilizing to further control and tune deployment dynamics as desired in specific vehicles and/or for specific applications.

In some embodiments, the throat may comprise an upper panel, a first side panel, a second side panel opposite from the first side panel, and a lower panel. The first side panel may be non-releasably coupled with the upper panel at a first side of the upper throat region, and the second side panel may be non-releasably coupled with the upper panel at a second side of the upper throat region opposite from the first side. In some such embodiments, the first side panel may be coupled with the upper panel at a first side of the upper throat region by a first sew line, the second side panel may be coupled with the upper panel at a second side of the upper throat region opposite from the first side by a second sew line, and the means for stabilizing may be sewn to the airbag cushion adjacent to at least a portion of the first sew line and adjacent to at least a portion of the second sew line. In some such embodiments, the means for stabilizing may be sewn or otherwise non-releasably coupled to the airbag cushion solely within selvage regions of the cushion, or otherwise solely within non-inflatable regions of the cushion.

In an example of a method for manufacturing an airbag cushion assembly according to certain implementations, the method may comprise forming a first sew line in an airbag cushion along a first side of the airbag cushion, forming a second sew line in the airbag cushion along a second side of the airbag cushion opposite from the first side, and non-releasably coupling a diffuser or other inflatable structure inside the airbag cushion about an inflator opening, such as a throat opening and/or hub opening, of the airbag cushion. The diffuser may also be sewn or otherwise non-releasably coupled to the first side of the airbag cushion and to the second side of the airbag cushion.

In some implementations, the step of forming a first sew line may comprise forming the first sew line between a top panel and a first side panel of the airbag cushion, and the step of forming a second sew line may comprise forming the second sew line between the top panel and a second side panel of the airbag cushion.

Some implementations may further comprise forming a third sew line between the first side panel and a bottom panel of the airbag cushion; and forming a fourth sew line between the second side panel and the bottom panel. In some such implementations, the first, second, third, and fourth sew lines may collectively define a throat region of the airbag cushion.

In some implementations, the step of non-releasably coupling the diffuser to the first side of the airbag cushion may comprise sewing the diffuser to the first side along at least one of a portion of the first sew line and a portion of the second sew line and a portion of the third sew line and a portion of the fourth sew line. In some such implementations, the diffuser may be non-releasably coupled to the airbag cushion along selvage regions of the cushion, such as selvage regions formed by the side panels, the top panels, and/or the bottom panels.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to airbag cushion assemblies comprising cushion stabilizers. In preferred embodiments, such stabilizers may be positioned and non-releasably secured inside the cushion. In some such embodiments, the stabilizer may comprise a diffuser or other inflatable structure positioned within the cushion, which may also be non-releasably sewn or otherwise non-releasably coupled to the cushion along opposite sides of the cushion, such as along opposing seams between a top panel and a side panel and/or along opposing seams between a bottom panel and a side panel, for example. Other embodiments disclosed herein may comprise non-inflatable structures, such as non-releasable tethers, as described below.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
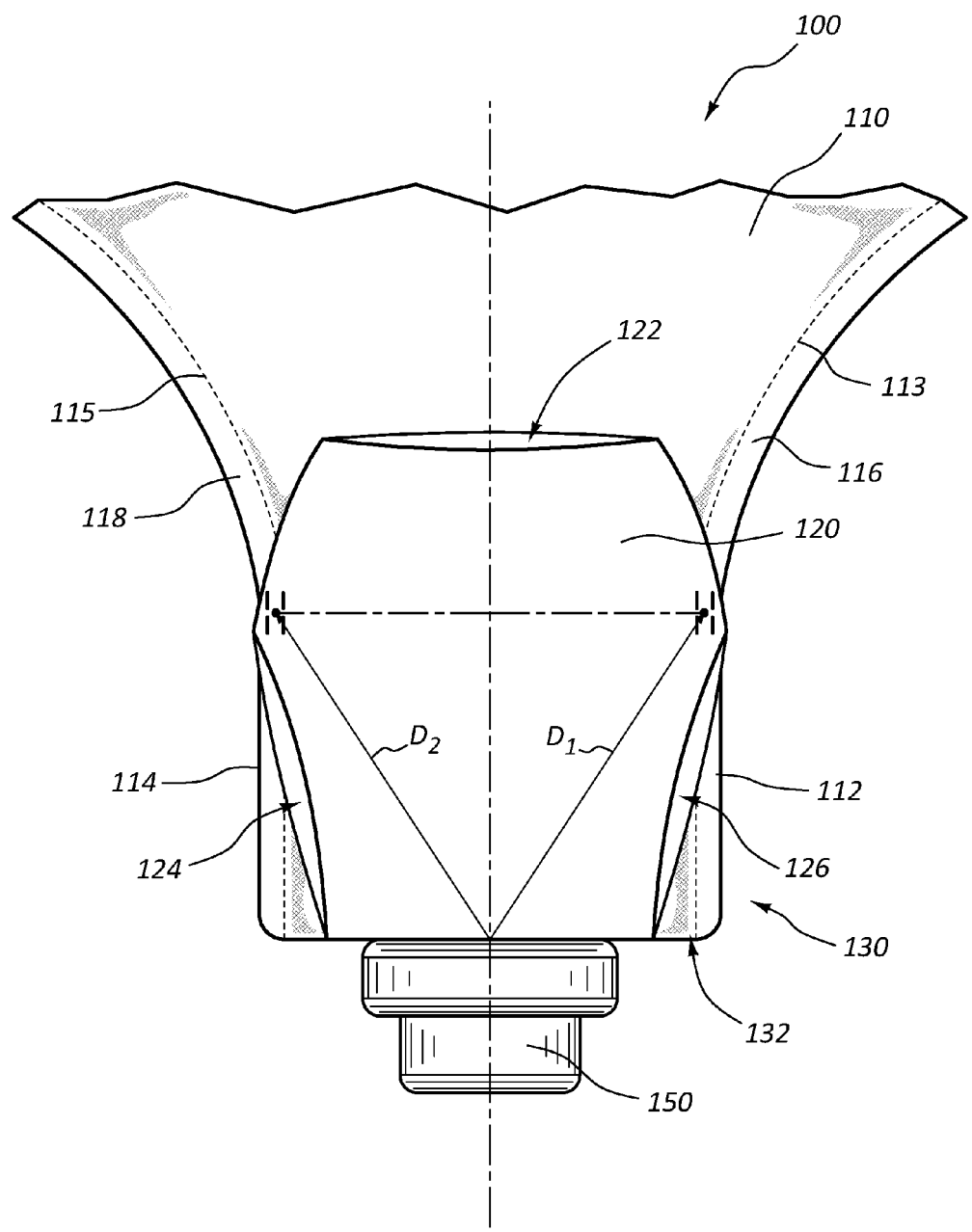
FIG. 1 is a plan cutaway view of an airbag cushion assembly according to some embodiments.

FIG. 1 depicts the inside of an embodiment of airbag cushion assembly 100. Airbag cushion assembly 100 may comprise one or more panels that may be sewn or otherwise coupled together to form an inflatable cushion. In the depicted embodiments, airbag cushion assembly 100 is depicted with a single panel 110. However, typically panel 110 would be coupled with at least one other panel to form an inflatable chamber. For purposes of illustration, the other panel (an upper panel, for example) has been removed from the drawing to allow for depiction of the interior of the cushion.

A stabilizing member 120 is positioned within the cushion formed in part by panel 110. In this particular embodiment, stabilizing member 120 comprises an inflatable structure and, more particularly, comprises a diffuser 120. Diffuser 120 is non-releasably coupled with panel 110 along a portion of a first side 112 and a portion of a second side 114 of panel 110. As previously mentioned, one or more other panels not depicted in FIG. 1 may be used to form an inflatable airbag cushion. Thus, sew lines 113 and 115 may be used to couple panel 110 to another panel. For example, in some embodiments, panel 110 may comprise an upper panel, which may be sewn or otherwise non-releasably coupled to a lower panel. Alternatively, panel 110 may be sewn or otherwise non-releasably coupled to a side panel, as described in greater detail in connection with other embodiments below.

In the embodiment of FIG. 1, diffuser 120 is non-releasably coupled with panel 110 at non-inflatable portions of the cushion. More particularly, diffuser 120 is sewn to panel 110 (and one or more adjacent panels not shown in the figure) at a first selvage region 116 of the airbag cushion assembly 100 along the first side 112 and at a second selvage region 118 of the airbag cushion assembly 100 along the second side 114.

In addition, diffuser 120 is positioned adjacent to a hub 130 of airbag cushion assembly 100, which defines hub opening 132. Thus, diffuser 120 is positioned immediately adjacent to hub opening 132 such that it is positioned and configured to receive inflation gas from an inflator 150. Upon receipt of such inflation gas, various openings in diffuser 120, such as top opening 122 and opposing side openings 124 and 126, may be used to distribute the gases to the internal chamber of the airbag cushion defined by panel 110 and one or more other panels.

In some embodiments, diffuser 120 may be sewn or otherwise non-releasably coupled with the airbag cushion at a first side, such as side 112, by a first distance D1 from a center of the hub opening 132, and may be sewn or otherwise non-releasably coupled with the airbag cushion at a second side, such as side 114 by a second distance D2 from the center of the hub opening 132. In some embodiments, distance D1 may differ from distance D2, which may be useful in controlling deployment characteristics.

For example, in some embodiments, coupling the diffuser or another similar internal, inflatable structure along opposing sides of an airbag cushion at different distances from the center of the hub opening may allow for tailored/tuned offset movement of the airbag cushion during deployment, which may assist in desired cushion positioning and/or inflation characteristics. In some embodiments, distance D1 may differ from distance D2 by at least about five percent. In some embodiments, distance D1 may differ from distance D2 by at least about ten percent. In some such embodiments, distance D1 may differ from distance D2 by between about ten percent and about fifty percent. In some such embodiments, distance D1 may differ from distance D2 by between about ten percent and about fifteen percent. For example, in a specific example of an airbag cushion assembly according to a preferred embodiment, distance D1 may be about 240 mm and distance D2 may be about 270 mm.

Figure 2:
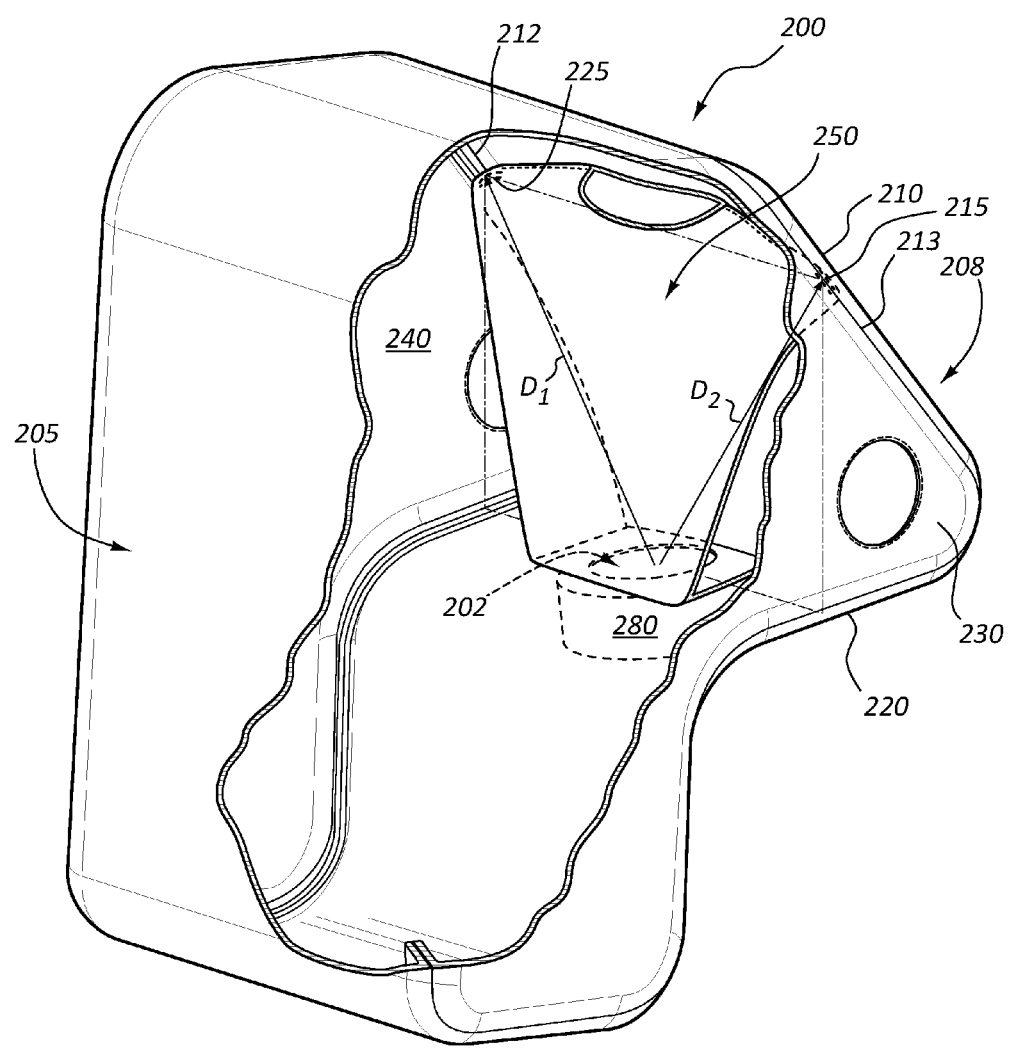
FIG. 2 is a perspective cutaway view of an airbag cushion assembly following deployment according to other embodiments.

FIG. 2 illustrates another example of an embodiment of an airbag cushion assembly 200. Airbag cushion assembly 200 comprises an airbag cushion 205 that is made up of several panels. More particularly, airbag cushion 205 comprises an upper panel 210, a lower panel 220, a first side panel 230, and a second side panel 240. Each of panels 210, 220, 230, and 240, at least partially defines a throat region 208 of airbag cushion 205. Although other panels may be used to form airbag cushion 205, for simplicity, only the panels defining throat region 208 will be discussed herein.

An inflatable structure comprising a diffuser 250 is positioned within an internal chamber defined by the various panels of airbag cushion 205. More particularly, diffuser 250 is non-releasably coupled with airbag cushion 205 at a hub region of airbag cushion 205 defining a hub opening 202. Because hub opening 202 is positioned within throat region 208, for purposes of this embodiment, it may also be considered a throat opening. Hub opening 202 is positioned adjacent to inflator 280 so as to receive inflation gases during deployment of the airbag cushion 205 through the hub opening 202. In some embodiments, diffuser 250 may be non-releasably coupled with airbag cushion 205 in this region by applying a sew line that extends about the perimeter of hub opening 202.

Diffuser 250 is also non-releasably coupled with airbag cushion 205 at opposing sides of throat region 208. More particularly, diffuser 250 is non-releasably coupled with airbag cushion 205 along opposing sides of an upper portion of throat region 208 at a first region 215 adjacent to panels 210 and 230 and at a second region 225 adjacent to panels 210 and 240.

In preferred embodiments, diffuser 250 is non-releasably coupled with airbag cushion 205 along, or at least partially along, non-inflatable regions of airbag cushion 205. For example, diffuser 250 may be sewn to a first selvage region 215 of airbag cushion 205 along a first side of airbag cushion 205 and at a second selvage region 225 of the airbag cushion 205 along a second side opposite from the first side. In the depicted embodiment, the first selvage region 215 may be adjacent to a sew line 213 coupling upper panel 210 and side panel 230. Similarly, the second selvage region 225 may be adjacent to another sew line 212 coupling upper panel 210 and opposite side panel 240.

Preferably, diffuser 250 is also coupled to airbag cushion 205 adjacent to hub opening 202. Thus, in some embodiments, diffuser 250 may be non-releasably coupled to airbag cushion 205 adjacent to hub opening 202 by applying a sew line about the perimeter of hub opening 202. However, alternative embodiments are contemplated. For example, one or more non-releasable tacks or sew lines may be positioned at specific locations adjacent to hub opening 202, such as at regular intervals about the periphery of hub opening 250, for example.

Figure 3:
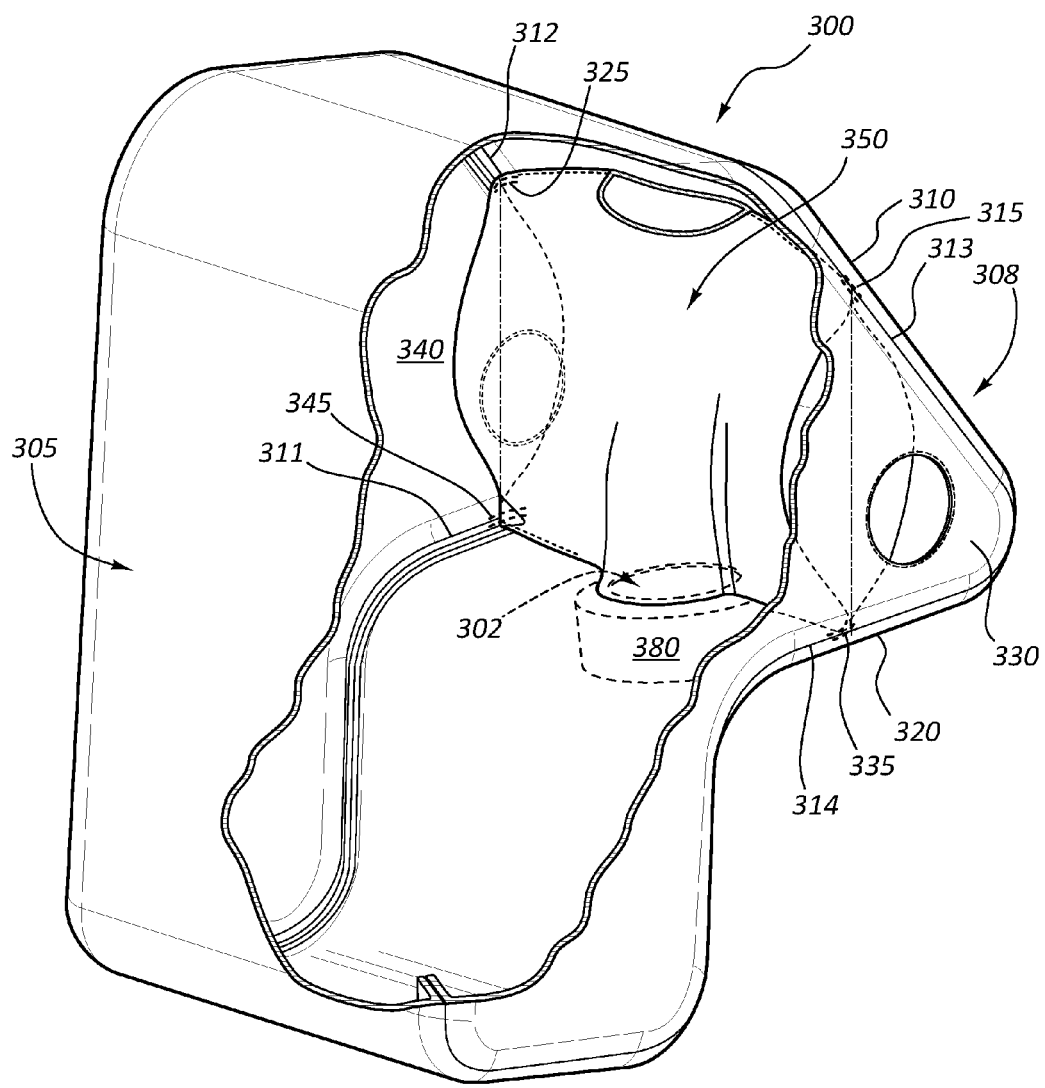
FIG. 3 is a perspective cutaway view of an airbag cushion assembly following deployment according to still other embodiments.

FIG. 3 illustrates another example of an embodiment of an airbag cushion assembly 300. Like airbag cushion assembly 200, airbag cushion assembly 300 comprises an airbag cushion 305 that is made up of several panels, namely, an upper panel 310, a lower panel 320, a first side panel 330, and a second side panel 340. Each of panels 310, 320, 330, and 340, at least partially defines a throat region 308 of airbag cushion 305. Other panels may be used to form airbag cushion 305. However, for simplicity, only the panels defining throat region 308 will be discussed herein.

An inflatable structure comprising a diffuser 350 is positioned within an internal chamber defined by the various panels of airbag cushion 305. More particularly, diffuser 350 is non-releasably coupled with airbag cushion 305 at a hub region of airbag cushion 305 defining a hub opening 302. Hub opening 302 is positioned adjacent to inflator 380 so as to receive inflation gases during deployment of the airbag cushion 305 through the hub opening 302.

Diffuser 350 is non-releasably coupled with airbag cushion 305 at opposing sides of throat region 308, and at opposing ends of throat region 308. Thus, unlike diffuser 250 of airbag cushion assembly 200, diffuser 350 is coupled with airbag cushion 305 at four discreet locations. More particularly, diffuser 350 is non-releasably coupled with airbag cushion 305 along opposing sides of an upper portion of throat region 308 at a first, upper region 315 adjacent to panels 310 and 330 and at a second, upper region 325 adjacent to panels 310 and 340. In addition, diffuser 350 is non-releasably coupled with airbag cushion 305 along opposing sides of a lower portion of throat region 308 at a first, lower region 335 adjacent to panels 320 and 330, and at a second, lower region 345 adjacent to panels 320 and 340.

In preferred embodiments, diffuser 350 is non-releasably coupled with airbag cushion 305 along, or at least partially along, non-inflatable regions of airbag cushion 305. For example, diffuser 350 may be sewn to a first selvage region 315 of airbag cushion 305 along a first, upper side of airbag cushion 305, at a second selvage region 325 of the airbag cushion 305 along a second, upper side opposite from the first side, at a third selvage region 335 of the airbag cushion along a lower portion of the first side of airbag cushion 305, and at a fourth selvage region 345 along a lower portion of the second side. In the depicted embodiment, the first selvage region 315 may be adjacent to a first sew line 313 coupling upper panel 310 and side panel 330, the second selvage region 325 may be adjacent to another sew line 312 coupling upper panel 310 and opposite side panel 340, the third selvage region 335 may be adjacent to a third sew line 314 coupling lower panel 320 and side panel 330, and the fourth selvage region 345 may be adjacent to a fourth sew line 311 coupling lower panel 320 and opposite side panel 340.

Preferably, diffuser 350 is also coupled to airbag cushion 305 adjacent to hub opening 302. As previously mentioned, diffuser 350 may be non-releasably coupled to airbag cushion 305 adjacent to hub opening 302 by applying a sew line about the perimeter of hub opening 302 or, alternatively, by other means, such as by applying one or more non-releasable tacks or sew lines at specific locations adjacent to hub opening 302.

Although diffuser 350 is shown non-releasably coupled with airbag cushion 305 at four discreet locations in the throat region 308 of the cushion, other embodiments are contemplated. For example, in some embodiments, diffuser 350 (or diffuser 250) may be coupled with airbag cushion 305 only at opposing sides of a lower portion of throat region 308, rather than only at opposing sides of an upper portion of the throat region, as depicted in FIG. 2.

Figure 4:
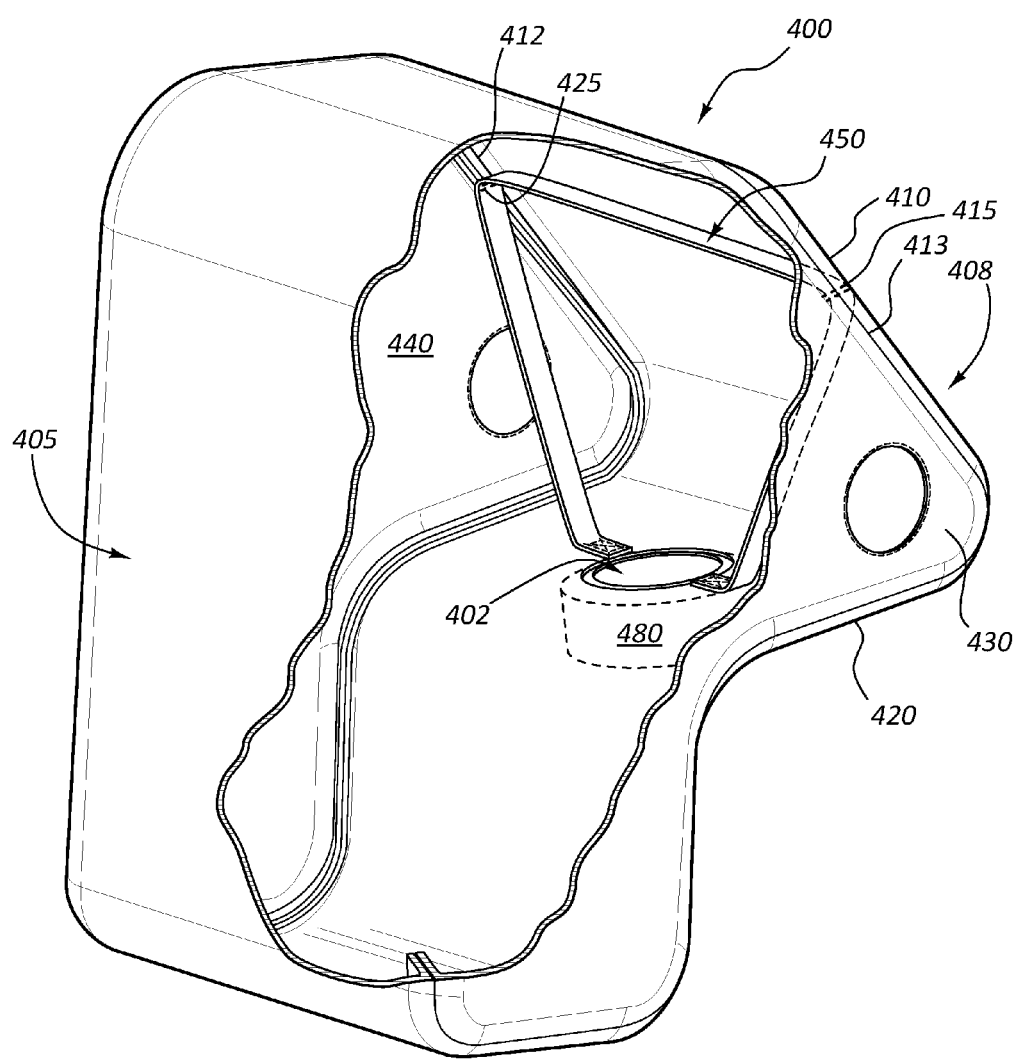
FIG. 4 is a perspective cutaway view of an airbag cushion assembly following deployment according to still further embodiments.

FIG. 4 illustrates still another example of an embodiment of an airbag cushion assembly 400. Airbag cushion assembly 400 also comprises an airbag cushion 405 that is made up of among others, an upper panel 410, a lower panel 420, a first side panel 430, and a second side panel 440, each of which at least partially defines a throat region 408 of airbag cushion 405.

Each of the diffusers described in FIGS. 1-3, namely, diffusers 120, 250, and 350, are examples of means for stabilizing an airbag cushion during deployment. Each of these diffusers is further configured to prevent, or at least inhibit, lateral skewing of the airbag cushion during deployment. Moreover, diffusers 120, 250, and 350 are each inflatable means for stabilizing an airbag cushion during deployment. However, unlike the embodiments previously described, airbag cushion assembly 400 comprises a means for stabilizing the airbag cushion during deployment that is not inflatable. Airbag cushion assembly 400 comprises a stabilizing means 450 that is positioned within an internal chamber defined by the various panels of airbag cushion 405, but is not itself inflatable.

More particularly, stabilizing means 450 comprises a non-releasable tether 450. Tether 450 may be non-releasably coupled with airbag cushion 405 at a hub region of airbag cushion 405 defining a hub opening 402. Hub opening 402 is positioned adjacent to inflator 480 so as to receive inflation gases during deployment of the airbag cushion 405 through the hub opening 402.

In the depicted embodiment, tether 450 is coupled adjacent hub opening 402 at opposite sides of hub opening 402. However, a variety of alternative embodiments will be apparent to those of ordinary skill in the art after having received the benefit of this disclosure. For example, tether 450 may comprise a ring section that may, like the diffusers described above, be non-releasably coupled with airbag cushion 405 about a perimeter of opening 402.

Tether 450 comprises three sections. A first section is non-releasably coupled with airbag cushion 405 at opposing sides of an upper portion of throat region 408. More particularly, the first section of tether 450 is non-releasably coupled with airbag cushion 405 along, or at least partially along, a first selvage region 415, or otherwise preferably along, or at least partially along, a non-inflatable region of airbag cushion 405. Similarly, the first section of tether 450 is non-releasably coupled to a second selvage region 425 of the airbag cushion 405 along a second, upper side opposite from the side of first selvage region 415.

A second section of tether 450 is coupled between selvage region 415 and a portion of airbag cushion 405 defining hub opening 402. Similarly, a third section of tether 450 is coupled between selvage region 425 and another portion of airbag cushion 405 defining hub opening 402 on an opposite side. In the depicted embodiment, tether 450 comprises a single, unitary piece of cloth or other suitable material. However, alternative embodiments are contemplated in which each of the various sections of tether 450 may be separate from one another.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:
1. An airbag cushion assembly, comprising:
an airbag cushion comprising a first side and a second side opposite from the first side;
a hub comprising a hub opening configured to be coupled with an inflator so as to receive inflation gases during deployment of the airbag cushion through the hub opening; and a diffuser positioned within the airbag cushion, wherein the diffuser is non-releasably coupled with the airbag cushion along at least a portion of the first side and along at least a portion of the second side, wherein the diffuser is non-releasably coupled with the airbag cushion adjacent to the hub opening, and wherein the diffuser is non-releasably coupled with the airbag cushion at a first selvage region of the airbag cushion along the first side and at a second selvage region of the airbag cushion along the second side.

2. The airbag cushion assembly of claim 1, wherein the airbag cushion further comprises a throat defining a throat region, wherein the hub is positioned within the throat region, and wherein the diffuser is non-releasably coupled with at least one of an upper portion of the throat and a lower portion of the throat at opposing sides of the throat.

3. The airbag cushion assembly of claim 2, wherein the throat comprises an upper panel, a first side panel, a second side panel opposite from the first side panel, and a lower panel, wherein the first side panel is coupled with the upper panel at a first side of the upper portion of the throat by a first sew line, wherein the second side panel is coupled with the upper panel at a second side of the upper portion of the throat opposite from the first side by a second sew line, and wherein the diffuser is sewn to the airbag cushion along at least a portion of the first sew line and along at least a portion of the second sew line.

4. The airbag cushion assembly of claim 3, wherein the diffuser is sewn to the airbag cushion along a first selvage region of the airbag cushion adjacent to the first sew line and along a second selvage region of the airbag cushion adjacent to the second sew line.

5. The airbag cushion assembly of claim 1, wherein the diffuser is non-releasably coupled with the airbag cushion at the first side by a first distance from a center of the hub opening, wherein the diffuser is non-releasably coupled with the airbag cushion at the second side by a second distance from the center of the hub opening, and wherein the first distance is at least about equal to the second distance.

6. The airbag cushion assembly of claim 1, wherein the diffuser is non-releasably coupled with the airbag cushion at the first side by a first distance from a center of the hub opening, wherein the diffuser is non-releasably coupled with the airbag cushion at the second side by a second distance from the center of the hub opening, and wherein the first distance is at least ten percent greater than the second distance.

7. An airbag cushion assembly, comprising:
an airbag cushion comprising a throat defining a throat region, wherein the throat comprises an upper throat region and a lower throat region, wherein the throat comprises an upper panel, a first side panel, a second side panel opposite from the first side panel, and a lower panel, wherein the first side panel is non-releasably coupled with the upper panel at a first side of the upper throat region, wherein the second side panel is non-releasably coupled with the upper panel at a second side of the upper throat region opposite from the first side, wherein the first side panel is coupled with the upper panel at a first side of the upper throat region by a first sew line, and wherein the second side panel is coupled with the upper panel at a second side of the upper throat region opposite from the first side by a second sew line;
a hub comprising a hub opening configured to be coupled with an inflator so as to receive inflation gases during deployment of the airbag cushion through the hub opening, wherein the hub is positioned within the throat region; and
means for stabilizing the airbag cushion during deployment, wherein the means for stabilizing is positioned within the airbag cushion, wherein the means for stabilizing is non-releasably coupled with the airbag cushion along at least one of opposing sides of the upper throat region and opposing sides of the lower throat region, and wherein the means for stabilizing is sewn to the airbag cushion adjacent to at least a portion of the first sew line and adjacent to at least a portion of the second sew line.

8. The airbag cushion assembly of claim 7, wherein the means for stabilizing is sewn to the airbag cushion along a first non-inflatable region of the airbag cushion adjacent to the first sew line and along a second non-inflatable region of the airbag cushion adjacent to the second sew line.

9. The airbag cushion assembly of claim 7, wherein the means for stabilizing comprises a diffuser.

10. The airbag cushion assembly of claim 9, wherein the diffuser is non-releasably coupled with the airbag cushion at the hub.

11. The airbag cushion assembly of claim 7, wherein the means for stabilizing is configured to provide internal structure to the airbag cushion during deployment.

12. The airbag cushion assembly of claim 7, wherein the means for stabilizing is non-releasably coupled with the airbag cushion at a first side of the throat by a first distance from a center of the hub opening, wherein the means for stabilizing is non-releasably coupled with the airbag cushion at a second side of the throat by a second distance from the center of the hub opening, and wherein the first distance is at least about equal to the second distance.

13. The airbag cushion assembly of claim 7, wherein the means for stabilizing is non-releasably coupled with the airbag cushion at a first side of the throat by a first distance from a center of the hub opening, wherein the means for stabilizing is non-releasably coupled with the airbag cushion at a second side of the throat by a second distance from the center of the hub opening, and wherein the first distance is not equal to the second distance.

14. A method for manufacturing an airbag cushion assembly, the method comprising the steps of:
forming a first sew line in an airbag cushion along a first side of the airbag cushion, wherein the step of forming a first sew line comprises forming the first sew line between a top panel and a first side panel of the airbag cushion, and wherein the step of forming a second sew line comprises forming the second sew line between the top panel and a second side panel of the airbag cushion;
forming a second sew line in the airbag cushion along a second side of the airbag cushion opposite from the first side;
non-releasably coupling a diffuser inside the airbag cushion about a throat opening of the airbag cushion;
non-releasably coupling the diffuser to the first side of the airbag cushion;
non-releasably coupling the diffuser to the second side of the airbag cushion;
forming a third sew line between the first side panel and a bottom panel of the airbag cushion; and
forming a fourth sew line between the second side panel and the bottom panel, wherein the first, second, third, and fourth sew lines collectively define a throat region of the airbag cushion, and wherein the step of non-releasably coupling the diffuser to the first side of the airbag cushion comprises sewing the diffuser to the first side along at least one of a portion of the first sew line and a portion of the second sew line and a portion of the third sew line and a portion of the fourth sew line.

15. An airbag cushion assembly, comprising:

an airbag cushion comprising a first side and a second side opposite from the first side;

a hub comprising a hub opening configured to be coupled with an inflator so as to receive inflation gases during deployment of the airbag cushion through the hub opening; and a diffuser positioned within the airbag cushion, wherein the diffuser is non-releasably coupled with the airbag cushion along at least a portion of the first side and along at least a portion of the second side, wherein the diffuser is non-releasably coupled with the airbag cushion adjacent to the hub opening, wherein the airbag cushion further comprises a throat defining a throat region, wherein the hub is positioned within the throat region, wherein the diffuser is non-releasably coupled with at least one of an upper portion of the throat and a lower portion of the throat at opposing sides of the throat, wherein the throat comprises an upper panel, a first side panel, a second side panel opposite from the first side panel, and a lower panel, wherein the first side panel is coupled with the upper panel at a first side of the upper portion of the throat by a first sew line, wherein the second side panel is coupled with the upper panel at a second side of the upper portion of the throat opposite from the first side by a second sew line, and wherein the diffuser is sewn to the airbag cushion along at least a portion of the first sew line and along at least a portion of the second sew line.

16. The airbag cushion assembly of claim 15, wherein the diffuser is non-releasably coupled with the airbag cushion at a first selvage region of the airbag cushion along the first side and at a second selvage region of the airbag cushion along the second side.

17. The airbag cushion assembly of claim 15, wherein the diffuser is non-releasably coupled with the airbag cushion at the first side by a first distance from a center of the hub opening, wherein the diffuser is non-releasably coupled with the airbag cushion at the second side by a second distance from the center of the hub opening, and wherein the first distance is at least about equal to the second distance.

18. The airbag cushion assembly of claim 15, wherein the diffuser is non-releasably coupled with the airbag cushion at the first side by a first distance from a center of the hub opening, wherein the diffuser is non-releasably coupled with the airbag cushion at the second side by a second distance from the center of the hub opening, and wherein the first distance is at least ten percent greater than the second distance.

* * * * *